United States Patent [19]

Crooker et al.

[11] Patent Number: 5,176,961
[45] Date of Patent: Jan. 5, 1993

[54] COLORED, TEXTURED GLASS-CERAMIC ARTICLES

[75] Inventors: David H. Crooker; Lina M. Echeverria, both of Corning, N.Y.

[73] Assignee: Corning Incorporated, Corning, N.Y.

[21] Appl. No.: 772,216

[22] Filed: Oct. 7, 1991

[51] Int. Cl.⁵ .................................................. B32B 9/00
[52] U.S. Cl. .................................... 428/409; 428/428; 428/701; 428/702; 428/913.3; 501/4; 501/7
[58] Field of Search .......................... 501/4, 7, 5, 3; 428/409, 428, 701, 702, 913.3

[56] References Cited

U.S. PATENT DOCUMENTS

| | | | |
|---|---|---|---|
| 4,461,839 | 7/1984 | Rittler | 501/4 |
| 5,010,041 | 4/1991 | Koyama | 501/7 |
| 5,066,524 | 11/1991 | Baba et al. | 501/4 |

Primary Examiner—Patrick J. Ryan
Assistant Examiner—Abraham Bahta
Attorney, Agent, or Firm—C. S. Janes, Jr.

[57] ABSTRACT

This invention is directed to the production of glass-ceramic articles comprising an interior portion and a surface layer exhibiting a variegated color, textured surface appearance. In the most preferred embodiment lithium disilicate crystals constitute the predominant crystal phase in both the interior portion and in the surface layer.

6 Claims, No Drawings

COLORED, TEXTURED GLASS-CERAMIC ARTICLES

The production of glass-ceramic articles has been conducted on a commercial scale for over three decades. In general, those glass-ceramic articles have been white in color unless a colorant, e.g., a transition metal oxide such as $Co_3O_4$, $Cr_2O_3$, CuO, $Fe_2O_3$, $MnO_2$, NiO, and $V_2O_5$, was included in the precursor glass composition or a colored glaze or enamel was applied to the surface thereof. Although the presence of color certainly can add beauty and variation to glass-ceramic articles, means were sought to add to the aesthetic appearance of glass-ceramic articles, particularly in articles having broad surface areas, such as large sheets for architectural applications, by eliminating the sameness inherent in large sheets of materials, whether white or colored. Whereas large sheets of white and colored glass-ceramic materials have been marketed commercially for building cladding by Corning Incorporated, Corning, N.Y. under the trademark PYRAM, it was believed that an improvement in the surface appearance of the sheets would stimulate sales thereof.

Therefore, the principal objective of the present invention was to develop a process for producing glass-ceramic bodies exhibiting a variegated color, surface textured appearance.

A specific objective was to develop such a process for use in fabricating architectural cladding members.

SUMMARY OF THE INVENTION

Those objectives can be achieved through an inventive process comprising five general steps:
(1) a glass displaying a desired color is prepared;
(2) the glass is subdivided into particles of desired sizes;
(3) a glass having a base composition similar to the glass in (1) is melted, poured, and formed into a molten glass article of a desired shape;
(4) the particles of (2) are dispersed atop the surface of the molten glass article;
(5) the molten glass articles with the glass particles atop the surface thereof is cooled to a solid glass article; and then
(6) the glass article is converted into a glass-ceramic article via heat treatment to cause nucleation and crystallization therein.

Comminuting the colored glass to particles of a desired size and distribution can be accomplished conveniently through grinding or milling. Those processes yield angular fragments and glass shards which impart aesthetic value to the final product. Moreover, those processes allow easy separation of the particles into controlled fraction sizes.

More than one particle fraction can be incorporated, thereby allowing for great aspect variability. For example, a coarser fraction of one color can be combined with a more finely-divided fraction of another color. Intermediate fractions are desirable because they retain their angular nature, thereby making them resemble mineral grains in naturally-occurring rocks. More finely-divided color particles can result in an overall mottled or peppered effect, or, in the case of dark colors, can create a convection effect as the convection currents that develop around individual grains bring down the partially molten color into the surrounding white matrix to produce a "cell-membrane" effect. Very coarse particles may not sink completely into the molten glass before it cools, resulting in protrusions from the surface, and very fine particles are impractical inasmuch as they are readily blown away by the radiant heat rising from the surface of the molten glass.

Two key factors undergirding the inventive process are listed below:
(1) The viscosity of the precursor glass is a vital factor in two aspects of the process.
  (a) A low glass viscosity provides a great advantage in delivering the glass for forming, particularly such forming processes as drawing and rolling sheet.
  (b) A low glass viscosity is advantageous during the incorporation therein of the colored glass particles because it allows the particles to sink gently into the glass surface, thereby producing a smooth surface.
(2) A close match in composition between the coloring particles and the glass matrix is necessary to inhibit their separation during cooling of the matrix glass due to mismatch in thermal expansion and to reduce residual stresses which can cause cracking.

As was observed above, large sheets of a glass-ceramic have been marketed as architectural cladding members under the trademark PYRAM, the predominant crystal phase present therein being $\beta$-quartz solid solution or $\beta$-spodumene solid solution, depending upon the heat treatment to which the precursor glass was subjected. Large sheets of a glass-ceramic containing canasite as the predominant crystal phase and of a glass-ceramic containing fluorrichterite as the predominant crystal phase can also be formed; the former type of glass-ceramic being encompassed within U.S. Pat. No. 4,386,162 (Beall) and the latter type being disclosed in U.S. Pat. No. 4,467,039 (Beall et al.) and U.S. Pat. No. 4,608,348 (Beall et al.).

Whereas large sheets can be formed from those glass-ceramic compositions, research has continued to discover glass-ceramics exhibiting properties even more desirably suited for building cladding applications. U.S. application Ser. No. 07/772,217, filed concurrently herewith by G. H. Beall et al. under the title LITHIUM DISILICATE GLASS-CERAMICS SOME OF WHICH ARE SELF-GLAZING, discloses the preparation of glass-ceramic articles wherein lithium disilicate comprises the predominant and, frequently, the sole crystal phase. The glass-ceramics disclosed therein consist essentially, in weight percent, of 8–19% $Li_2O$, 0–5% $Na_2O$, 0–7% $K_2O$, 0–8% $Na_2O+K_2O$, 0–10% CaO, 0–6% SrO, 0–6% BaO, 2–12% $Na_2O+K_2O+CaO+SrO+BaO$, 0–7% ZnO, 0–11% $Al_2O_3$, 1.5–11% $ZnO+Al_2O_3$, with a molar ratio $(Na_2O+K_2O+CaO+SrO+BaO):(ZnO+Al_2O_3)$ between 0.075–1.25, 65–80% $SiO_2$, and as a nucleating agent 1.5–7% $P_2O_5$ and/or 0.0001–0.1% Pd. Glass-ceramics which developed surfaces exhibiting high gloss during the crystallization of the precursor glass into a glass-ceramic are prepared from compositions consisting essentially, in weight percent, of 9–18% $Li_2O$, 0–7% $K_2O$, 0–8% CaO, 0–6% SrO, and 0–6% BaO, 2–10% $K_2O+CaO+SrO+BaO$, 0–7% ZnO, 0–10% $Al_2O_3$, 1.5–10% $ZnO+Al_2O_3$, with a molar ratio $(K_2O+CaO+SrO+BaO):(ZnO+Al_2O_3)$ between 0.1–0.8, 65–77% $SiO_2$, and as a nucleating agent 2–6% $P_2O_5$. The utility of adding 0.01–7% total of CdS, cadmium sulfoselenide, or a transition metal oxide to impart color to the glass-ceramic articles is also described in that application.

The entire disclosure of that application is incorporated herein by reference.

As is explained in Ser. No. 07/772,217, glasses having compositions approximating the stoichiometry of lithium disilicate ($Li_2O.2SiO_2$) can only be melted at very high temperatures and are very thermally unstable, that is, they are quite subject to devitrification, that latter failing having to date prevented the production of glass-ceramic articles containing $Li_2O.2SiO_2$ crystals as the predominant crystal phase on a commercial scale therefrom because of an inadequacy of microstructural tailoring demands for necessary property control. Accordingly, whereas the manufacture of glass-ceramic articles containing $Li_2O.2SiO_2$ crystals as the primary crystal phase (often employing $P_2O_5$ as a nucleating agent) has been reported in the art, with high mechanical strengths being attributed thereto, the inherent serious instability of the parent glasses has precluded the obtention of reproducible properties in the glass-ceramic articles which is so necessary in commercial production. However, because of the high mechanical strengths which have been exhibited by such glass-ceramic articles when the $Li_2O.2SiO_2$ crystals have been relatively uniformly fine-grained and homogeneously dispersed throughout the articles, research was undertaken to devise precursor glass compositions and heat treatment schedules therefor which would lead to sound glass-ceramic articles containing $Li_2O.2SiO_2$ as the predominant crystal phase wherein the properties thereof would be reproducible. Ser. No. 07/772,217 encompasses the results of that research.

The high strength and toughness and the optional glossy surface of the inventive glass-ceramic articles, coupled with the relatively easy melting and forming of their parent glasses, have suggested their use as architectural cladding members. Thus, their high strength and toughness enable them to be used in thinner cross section and larger surface area members than conventional ceramic materials utilized for that purpose. Furthermore, their high toughness values permit sheet to be scored and cut in the field, thereby making for easy and low cost installation.

Glass-ceramic articles containing $Li_2O.2SiO_2$ as the predominant crystal phase are white in color. As was observed in Ser. No. 07/772,217, however, they can be colored through the incorporation of about 0.01-7% by weight of CdS, cadmium sulfoselenide, and transition metal oxides in the parent glasses, expressly noting the utility of $Co_3O_4$, $Cr_2O_3$, CuO, $Fe_2O_3$, $MnO_2$, NiO, and $V_2O_5$.

Because the properties exhibited by the glass-ceramic compositions disclosed in Ser. No. 07/772,217 render them especially suitable for use as building cladding members, they constitute the preferred embodiments of the present invention. Accordingly, the subject invention will be described with particular reference to those compositions.

As has been observed above, the lithium disilicate glass-ceramics described in Ser. No. 07/772,217 demonstrate very high mechanical strengths (modulus of rupture values ranging from 22-36 Kpsi have been measured on abraded bar samples) and high toughness ($K_{IC}$ values up to 4.2 MPa$\sqrt{}$m have been measured). Those mechanical properties are not seriously deteriorated by the inclusion of fragments of the precursor glass in the matrix of precursor glass inasmuch as the particles, themselves, exhibit high mechanical strength and toughness. Thus, modulus of rupture measurements of about 19-24 Kpsi have been made on variegated colored samples prepared in the laboratory. Those high strength and toughness values permit their use as architectural cladding members in thinner cross section, that thinness translating into lower sheet weights, an advantage from the standpoints of cost and ease of installation.

The glossy surface and body translucence impart a very attractive appearance to the inventive materials. Furthermore, the intensity of the surface gloss can be varied through management of the maximum heat treatment (crystallization) temperature. Translucency is an important aesthetic property inasmuch as it adds depth and, hence, a third dimension to architectural cladding members.

As can be readily realized, to assure that the four above-described key factors are obtained, the glass particles will have a composition closely approximating that of the base glass constituting the precursor for the glass-ceramic body. Therefore, glass-ceramic bodies exhibiting a variegated surface colored, textured appearance are prepared in accordance with the following general steps:

(a) a batch for a glass capable of being converted through thermal treatment to a glass-ceramic and containing a colorant is melted;

(b) that melt is cooled and simultaneously shaped into a glass body of a desired configuration;

(c) that glass body is comminuted into particles of desired sizes;

(d) a batch for a glass having a similar base composition to that in Step (1), but either without a colorant or containing a colorant different from that contained within the glass of Step (1), is melted;

(e) that melt is formed into a desired shape while in the molten state;

(f) particles of said colored glass are dispersed atop at least a portion of the surface of said molten glass shape;

(g) said molten glass shape with the glass particles atop is cooled to a solid glass article, the molten glass shape being optionally reformed into a solid glass article of a different configuration during the cooling process; and thereafter (h) said glass article is subjected to a thermal treatment at a temperature and for a time sufficient to cause said glass article and said glass particles to crystallize in situ.

Most generally, the heat treatment of Step (h) will be conducted in two stages. In the first stage the solid glass article with the glass particles atop will be heated to a temperature at which nucleation takes place, i.e., temperatures around the annealing point of the glass and somewhat higher. Thereafter, the temperature is raised to above the softening point of the glass to cause the growth of crystals on the nuclei. As is well-recognized in the glass-ceramic art, the nucleation and crystallization temperatures are dependent upon the composition of the precursor glass. Hence, nucleation temperatures can range about 475°-900° C. and crystallization temperatures about 750°-1100° C. The time required for significant nucleation is directly related to the temperature of the nucleating step; nucleation generally being more rapid as the temperature is raised. In like manner, crystallization typically occurs more rapidly as the temperature increases. Because commercial practice normally desires rapid nucleation and crystallization, but with a minimum amount of thermal distortion of the article, nucleation temperatures permitting substantial nucleation to take place within about 0.5-4 hours and crystallization periods of about 1-8 hours will be employed. It will be appreciated that substantial dwell periods at individual temperatures are not demanded. The temperature can be raised slowly through the nucleation and crystallization ranges. It is only necessary that the precursor article be exposed to temperatures within those ranges for a sufficient length of time for nucleation and crystal growth to occur.

The following recital of method steps illustrates the inventive method with specificity utilizing the preferred composition embodiment of the invention; viz., glass-ceramics containing $Li_2O.2SiO_2$ as the predominant crystal phase. Thus:

(1) a batch for a glass consisting essentially, expressed in terms of weight percent on the oxide basis, of 8–19% $Li_2O$, 0–5% $Na_2O$, 0–7% $K_2O$, 0–8% $Na_2O+K_2O$, 0–10% CaO, 0–6% SrO, 0–6% BaO, 2–12% $Na_2O+K_2O+CaO+SrO+BaO$, 0–7% ZnO, 0–11% $Al_2O_3$, 1.5–11% $ZnO+Al_2O_3$, with a molar ratio $(Na_2O+K_2O+CaO+SrO+BaO):(Al_2O_3+ZnO)$ between 0.075–1.25, 65–80% $SiO_2$, and as a nucleating agent 1.5–7% $P_2O_5$ and/or 0.0001–0.1% Pd, and 0.01–7% of a colorant is melted;

(2) that melt is cooled and simultaneously shaped into a glass body of a desired configuration;

(3) that glass body is comminuted into particles of desired sizes;

(4) a batch for a glass consisting essentially, expressed in terms of weight percent in the oxide basis of 8–19% $Li_2O$, 0–5% $Na_2O$, 0–7% $K_2O$, 0–8% $Na_2O+K_2O$, 0–10% CaO, 0–6% SrO, 0–6% BaO, 2–12% $Na_2O+K_2O+CaO+SrO+BaO$, 0–7% ZnO, 0–11% $Al_2O_3$, 1.5–11% $ZnO+Al_2O_3$, with a molar ratio $(Na_2O+K_2O+CaO+SrO+BaO):(ZnO+Al_2O_3)$ between 0.075–1.25, 65–80% $SiO_2$, and as a nucleating agent 1.5–7% $P_2O_5$ and/or 0.0001–0.1% Pd and, optionally, 0.01–7% of a colorant is melted;

(5) that melt is formed into a desired shape while in the molten state;

(6) particles of said colored glass are dispersed atop the surface of said molten glass shape;

(7) said molten glass shape is cooled and optionally reformed into a solid glass article;

(8) said glass article is subjected to a heat treatment at a temperature and for a time sufficient to cause said glass article and said glass particles to crystallize in situ.

To obtain the most desirable physical properties therein, the glass shape having the particles of colored glass in the surface thereof will be initially exposed to a temperature between about 475°–700° C. for a period of time sufficient to generate the development of nuclei therewithin and thereafter will be subjected to a temperature of about 750°–1100° C. for a sufficient length of time to effect the growth of crystals on the nuclei. Stated in another more general way, Step (8) comprises two elements; a nucleation treatment followed by a crystallization heat treatment. In the most preferred practice with $Li_2O.2SiO_2$ crystal-containing articles, nucleation temperatures of about 450°–600° C. for periods in excess of one hour, commonly about three hours, will be employed along with periods of crystallization (750°–1000° C.) of about 1–4 hours.

Where a self-glazing final lithium disilicate-containing glass-ceramic product is desired, the base precursor glass composition will consist essentially, expressed in terms of weight percent on the oxide basis, of 9–18% $Li_2O$, 2–10% total of at least one member of the group consisting of 0–7% $K_2O$, 0–8% CaO, 0–6% SrO, and 0–6% BaO, 0–7% ZnO, 0–10% $Al_2O_3$, 1.5–10% $ZnO+Al_2O_3$, with a molar ratio $(K_2O+CaO+SrO+BaO):(ZnO+Al_2O_3)$ between 0.1–0.8, 65–77% $SiO_2$, and as a nucleating agent 2–6% $P_2O_5$. The optional inclusion of up to 3% $ZrO_2$ can be useful in controlling the translucency of the final product; i.e., by lowering the translucency of the incorporated particles which, in turn, enhances the contrast to the base glass.

In general, the size of the colored particles dispersed in the surface of the molten glass will range from about 9.51 mm to 74 microns, i.e., United States Standard Sieve sizes of 0.375 inches to 200 mesh. However, as was observed above, very coarse particles may not sink completely in the melt before it cools down, and very finely-divided powders are prone to be blown away as the particles are dispersed atop the molten glass. Accordingly, in the preferred practice the colored particles will range in size from about 3.5 mesh (5.66 mm) to 80 mesh (177 microns).

Where the glass-ceramic body is desired to be colored as well as the surface layer thereof, 0.01–7% of a colorant is included in the base composition of the precursor glass. Such a colorant will frequently be selected from the group consisting of CdS, cadmium sulfoselenide, $CeO_2$, $Co_3O_4$, $Cr_2O_3$, CuO, $Fe_2O_3$, $MnO_2$, NiO, and $V_2O_5$.

DESCRIPTION OF THE PREFERRED EMBODIMENTS

Table I reports a group of glass compositions, expressed in terms of parts by weight on the oxide basis, illustrating the inventive method. Because the sum of the recorded constituents closely approximates 100, for all practical purposes the individual amounts listed in the table may be considered to reflect weight percent. The actual batch ingredients may comprise any materials, either an oxide or other compound, which, when melted together with the other components, will be converted into the desired oxide in the proper proportions. For example, $Li_2CO_3$ may constitute the source of $Li_2O$ and $AlPO_4$ may provide the source of both $Al_2O_3$ and $P_2O_5$.

Examples 1-4 illustrate compositions capable of forming self-glazing glass-ceramics containing $Li_2O.2SiO_2$ crystals as the predominant crystal phase. Example 5 represents the glass-ceramic product marketed under the trademark PYRAM, and Examples 6 and 7 reflect glass-ceramics containing canasite and fluorrichterite, respectively, as the predominant crystal phase.

TABLE I

|  | 1 | 2 | 3 | 4 | 5 | 6 | 7 |
| --- | --- | --- | --- | --- | --- | --- | --- |
| $SiO_2$ | 69.3 | 73.5 | 76.5 | 68.6 | 62.8 | 57.2 | 67.1 |
| $Al_2O_3$ | — | 3.5 | — | 8.56 | 20.0 | 1.99 | 1.7 |
| $Li_2O$ | 15.4 | 15.3 | 13.4 | 11.2 | 3.5 | — | 0.8 |
| $K_2O$ | 6.05 | 3.22 | 3.38 | — | 0.15 | 8.78 | 4.7 |
| ZnO | 5.28 | — | 2.92 | — | 2.2 | — | — |
| $P_2O_5$ | 3.84 | 4.3 | 3.84 | 4.18 | — | — | 1.1 |
| $ZrO_2$ | — | — | — | 2.4 | — | — | — |
| CaO | — | — | — | 4.67 | — | 20.1 | 4.6 |
| $B_2O_3$ | — | — | — | — | 2.0 | — | — |
| $Na_2O$ | — | — | — | — | 0.4 | 7.98 | 3.3 |
| MgO | — | — | — | — | 1.8 | 0.109 | 14.3 |
| $TiO_2$ | — | — | — | — | 4.45 | — | — |
| $Sb_2O_3$ | — | — | — | — | 0.82 | — | 0.2 |
| F | — | — | — | — | — | 6.28 | 3.3 |

TABLE I-continued

|     | 1 | 2 | 3 | 4 | 5 | 6 | 7 |
|-----|---|---|---|---|---|---|---|
| BaO | — | — | — | — | — | — | 0.2 |

Table II records a group of colorants, expressed in terms of weight percent, which were added to the batches of the glasses of Table I, along with the color exhibited by each single or combination addition after particles of the glass containing those additions were dispersed in the surface of glass melts of Table I, and those melts were cooled to glass bodies and those glass bodies heat treated to be transformed into glass-ceramic bodies. Colors A–J reflect additions of colorants to Glasses 1–4; colors K–M record additions of colorants to Glass 5; colors N–S report additions of colorants to Glass 6; and color T to Glass 7. Colors R, S, and U were prepared by adding CdS and Se to the glass batch to form cadmium sulfoselenide in the glass.

TABLE II

|   | Color | $Co_3O_4$ | NiO | $Fe_2O_3$ | $MnO_2$ | CuO | $Cr_2O_3$ | $CeO_2$ | CdS | Se |
|---|---|---|---|---|---|---|---|---|---|---|
| A | Dark blue | 2.1 | 3.6 | 0.9 | — | — | — | — | — | — |
| B | Slate blue | 1.0 | 2.9 | — | — | — | — | — | — | — |
| C | Pink | — | — | — | 1.96 | — | — | — | — | — |
| D | Lt. brown | 2.9 | — | — | — | — | — | — | — | — |
| E | Dark brown | — | — | — | 3.8 | 0.29 | — | — | — | — |
| F | Periwinkle | 0.01 | — | — | — | — | — | — | — | — |
| G | Pale gray brown | — | 0.03 | — | — | — | — | — | — | — |
| H | Lt. steel blue | 0.01 | 0.03 | 0.03 | — | — | — | — | — | — |
| I | Icy aqua | — | — | — | — | 0.03 | — | — | — | — |
| J | Mint green | — | — | — | — | — | 0.02 | — | — | — |
| K | Beige | — | — | — | — | — | — | 1.8 | — | — |
| L | Blue gray | 0.22 | 0.61 | — | 0.82 | — | — | — | — | — |
| M | Gray | 0.5 | 3 | — | — | — | — | — | — | — |
| N | Slate blue | 0.05 | — | — | — | — | 0.05 | — | — | — |
| O | Blue* | 0.05 | — | — | — | — | 0.05 | — | — | — |
| P | Dark brown | — | 0.05 | — | — | — | 0.01 | — | — | — |
| Q | Grey** | — | 0.05 | — | — | — | 0.01 | — | — | — |
| R | Red | — | — | — | — | — | — | — | 0.5 | 0.7 |
| S | Orange | — | — | — | — | — | — | — | 0.35 | 0.5 |
| T | Pale blue | 0.05 | — | — | — | — | 0.05 | — | — | — |
| U | Ivory | — | — | — | — | — | — | 0.02 | — | — |

*oxidizing conditions
**reducing conditions

The batch ingredients for the glasses recited in Table I were compounded, ballmilled together to aid in obtaining a homogeneous melt, and charged into platinum crucibles. The crucibles were introduced into a furnace operating at about 1450° C., the batches melted for about 16 hours, and the melts then poured into steel molds having dimensions of about 5"×5"×0.5" (~12.7×12.7×1.3 cm).

Batch ingredients for the glasses recited in Table I to which proportions of CdS and Se or the transition metal oxides reported in Table II were included were compounded, ballmilled together to assist in securing a homogeneous melt, and charged into platinum crucibles. The crucibles were moved into a furnace operating at about 1450° C., the batches melted for about 16 hours, and the melts then poured as a fine stream into a bath of tap water, whereby the stream of glass is broken up into fine particles of glass, a practice termed "drigaging" in the glass art. The glass particles were milled and sieved into the various mesh fractions listed in Table III.

TABLE III

| Fraction No. | U.S. Standard Sieve Mesh Numbers |
|---|---|
| 5 | Between 80 & 200 mesh (177–74 microns) |
| 4B | Between 40 & 80 mesh (420–177 microns) |
| 4C | Between 20 & 40 mesh (841–420 microns) |
| 4 | Between 20 & 80 mesh (841–177 microns) |
| 3A | Between 12 mesh & 20 mesh (1680–84 microns) |
| 3 | Between 5 mesh & 20 mesh (4 mm–841 microns) |
| 2 | Between 0.375" & 5 mesh (9.6 mm–4 mm) |
| 1 | Greater than ~0.375" (~9.6 mm) |

The glass particles were dispersed over the surface of the above-described melts in the steel molds and the molds then transferred to an annealer operating at about 450° C.

It will be appreciated that, although the above description reflects laboratory activity only, the glasses operable in the present invention can be melted in large commercial melting units and formed into desired shapes by means of conventional glass melting and forming practices. For example, as noted above, sheet for use as building cladding members, can be drawn or rolled. Hence, it is only necessary that the compositions be fired at sufficiently high temperatures and for a sufficient length of time to produce a homogeneous melt, and thereafter the melt is cooled and simultaneously shaped into a glass body. Drigaging was employed as a manner of convenience. If desired, the colored glass may be simply formed into a body which is then comminuted to desired particle sizes.

The glass bodies were withdrawn from the annealer, samples for testing purposes cut therefrom, e.g., test bars for measuring modulus of rupture, and those test samples plus the remainder of the bodies exposed to the heat treatments recited in Table IV, whereby the glasses were crystallized in situ to glass-ceramic bodies.

TABLE IV

| Example No. | Glass No. | Colorant No. | Mesh Fractions | Heat Treatment |
|---|---|---|---|---|
| 1 | 1 | C and B | 3 and 4 | R.T.* to 650° C. at 300° C./hr |
|   |   |   |   | Hold at 650° C. for 4 hrs |
|   |   |   |   | 650°–850° C. at 300° C./hr |
|   |   |   |   | Hold at 850° C. for 4 hrs |

TABLE IV-continued

| Example No. | Glass No. | Colorant No. | Mesh Fractions | Heat Treatment |
|---|---|---|---|---|
| | | | | Cool at furnace rate** |
| 2 | 1 | B and A | 3 and 4 | Same as above |
| 3 | 2 | B and A | 3 and 4 | Same as above |
| 4 | 2 | C and E | 4 and 3 | Same as above |
| 5 | 3 | H | 3 | Same as above |
| 6 | 3 | I | 3 | R.T.* to 480° C. at 300° C./hr |
| | | | | Hold at 480° C. for 4 hrs |
| | | | | 480°-850° C. at 300° C./hr |
| | | | | Hold at 850° C. for 4 hrs |
| | | | | Cool at furnace rate** |
| 7 | 6 | O | 3A | R.T. to 850° C. at 100 C./hr |
| | | | | Hold at 850° C. for 1 hr |
| | | | | Cool at furnace rate |
| 8 | 6 | Q, R & S | 4 | Same as above |
| 9 | 7 | T | 4 | R.T. to 980° C. at 100° C./hr |
| | | | | Hold at 980° C. for 2 hrs |
| | | | | Cool at furnace rate |

*Room temperature.
**Electric current to furnace cut off and sample cooled to R.T. therein.

EXAMPLE 10

Batch ingredients for Glass No. 3 of Table I to which the colorant G of Table II was included were compounded, ballmilled together, and charged into a platinum crucible. The crucible was transferred to a furnace operating at about 1450° C., the batch melted for about 16 hours, and thereafter poured into a steel mold having dimensions of about 5"×5"×0.5" (~12.7×12.7×1.3 cm).

Batch ingredients for Glass 3 of Table I to which the colorant I of Table II was included were compounded, ballmilled together, and charged into a platinum crucible. The crucible was moved into a furnace operating at about 1450° C., the batch melted for about 16 hours, the melt drigaged into a bath of tap water, and the glass particles milled to mesh fraction 3.

Those glass particles were scattered atop the molten glass in the steel mold and the mold then introduced into an annealer operating at about 450° C. Thereafter, the glass body was subjected a heat treatment comprising heating from R.T. to 480° C. at 300° C./hour, holding at 480° C. for four hours, heating from 480° C. to 850° C. for four hours, and then cooling to R.T. at furnace rate to cause the glass to crystallize in situ.

The final glass-ceramic body consisted of a body portion exhibiting a pale gray brown color with a variegated surface of spots of icy aqua color.

EXAMPLE 11

A molten glass body having the base composition of Glass No. 3 of Table I to which the colorant H of Table II was included was prepared in like manner to the description of Example 10. Particles of glass having the base composition of Glass No. 3 to which colorant I was included were prepared in mesh fraction 4. Particles of glass having the base composition of Glass No. 3 to which colorant J was included were prepared in mesh fraction 3. The glass particles containing colorant I were broadcast on one portion of the molten glass body and the glass particles containing colorant J were dispersed atop a second portion of the molten glass body; after which the glass body was annealed and crystallized in situ utilizing the heat treatment schedule of Example 10.

The final product comprised a body portion colored a light steel blue with one surface portion having spots of icy aqua color and a second surface portion having spots of mint green color.

EXAMPLE 12

A molten glass body having the base composition of Glass No. 4 of Table I was prepared in like manner to the description of Example 10. Particles of glass having the base composition of Glass No. 4 to which colorant L was included were produced in mesh fraction 4. Those glass particles were crystallized in situ via heating at a rate of 100° C./hour from R.T. to 850° C., maintaining that temperature for one hour, and then cooling to R.T. at furnace rate. The crystallized particles were dispersed atop the molten glass body, after which the glass body was annealed and then crystallized in situ using the same heat treatment employed above in crystallizing the glass particles.

The final product consisted of a white body portion with a variegated surface of spots of brown color.

EXAMPLE 13

Batch ingredients for Glass No. 5 of Table I to which colorant K of Table II was included were compounded, thoroughly mixed together, and charged into a platinum crucible. The crucible was moved into a furnace operating at about 1625° C., the batch melted for about 16 hours, and thereafter poured into a steel mold having dimensions of about 5"×5"×1.5" (~12.7×12.7×3.8 cm) and held therein in a molten state.

Batch ingredients for Glass No. 5 of Table I were compounded, thoroughly mixed together, and charged into a platinum crucible. The crucible was introduced into a furnace operating at about 1625° C., the batch melted for 16 hours, and then poured into a steel mold. The resulting glass was milled and sieved to produce mesh fraction 4. Those glass particles were scattered atop molten Glass No. 5 containing colorant K in the steel mold.

The molten glass body was cooled, removed from the steel mold, and transferred to an annealer operating at about 660° C. Thereafter, the glass body was subjected to the following crystallization heat treatment:
(1) heating from R.T. to 750° C. at 300° C./hour;
(2) holding at that temperature for 1.5 hours;
(3) heating at 300° C./hour to 950° C.;
(4) holding at that temperature for 1.5 hours;
(5) cooling to R.T. at furnace rate.

The final product comprised a glass-ceramic article consisting of a body portion of a beige coloration with a variegated surface containing spots of white color.

EXAMPLE 14

Batch ingredients for Glass No. 6 of Table I were compounded, ballmilled together, and charged into a platinum crucible. The crucible was transferred to a furnace operating at about 1325° C., the batch was melted 3.5 hours, and thereafter poured into a steel mold having dimensions of about 5"×5"×0.5" (~12.7×12.7×1.3 cm).

Particles of glass having the base composition of Glass No. 6 to which colorant P was included were prepared in mesh fraction 3A. Particles of glass having base composition of Glass No. 6 to which colorant S was included were prepared in mesh fraction 4. Those glass particles were scattered atop the molten glass body in the steel mold and that body then introduced into an annealer operating at 500° C. Thereafter, the glass body was subjected to a heat treatment comprising heating from R.T. to 850° C. at 100° C./hr., holding one hour at 850° C., and then cooling to R.T. at furnace rate to cause the glass to crystallize in situ.

The final glass-ceramic body consisted of a body portion exhibiting a pale white color with a variegated surface of spots of dark brown and orange color.

EXAMPLE 15

Batch ingredients for Glass No. 7 of Table I were compounded, ballmilled together, and charged into a platinum crucible. The crucible was transferred to a furnace operating at about 1425° C., the batch was melted for about 4 hours, and thereafter poured into a steel mold.

Particles of glass having the base composition of Glass No. 7 to which colorant T was included were prepared in mesh fraction 3A. Particles of glass having the base composition of Glass No. 7 to which colorant U was included were prepared in fraction 4. Those glass particles were scattered atop the molten glass body in the steel mold and that body then introduced into an annealer operating at 600° C. Thereafter, the glass body was subjected to a heat treatment comprised of heating from R.T. to 980° C. at 100° C./hr, maintaining the temperature for two hours, and then cooling at furnace rate.

The final glass body consisted of a body portion exhibiting a white color with a variegated surface of spots of a pale blue color.

We claim:

1. A glass-ceramic article wherein lithium disilicate crystals constitute the predominant crystal phase comprising an interior portion and a surface layer wherein at least a portion of said surface layer exhibits a variegated color, textured appearance resulting from the presence of a colorant therein, said interior portion and said surface layer having the same base composition consisting essentially, expressed in terms of weight percent on the oxide basis, of 8-19% $Li_2O$, 0-5% $Na_2O$, 0-7% $K_2O$, 0-8% $Na_2O+K_2O$, 0-10% CaO, 0-6% SrO, 0-6% BaO, 2-12% $Na_2O+K_2O+CaO+SrO+BaO$, 0-7% ZnO, 0-11% $Al_2O_3$, 1.5-11% ZnO $Al_2O_3$, with a molar ratio $(Na_2O+K_2O+CaO+SrO+BaO):(ZnO+Al_2O_3)$ between 0.075-1.25, 65-80% $SiO_2$, and 1.5-7% $P_2O_5$ and/or 0.0001-0.1% Pd as a nucleating agent and the same crystal phase(s).

2. A glass-ceramic article according to claim 1 wherein the colorant contained in said surface layer is present in an amount of about 0.01-7% by weight total and is selected from the group consisting of CdS, cadmium sulfoselenide, $CeO_2$, $Co_3O_4$, $Cr_2O_3$, CuO, $Fe_2O_3$, $MnO_2$, NiO, $V_2O_5$, and mixtures thereof.

3. A glass-ceramic article according to claim 1 wherein said interior portion is also colored through the presence of a colorant therein in an amount of about 0.01-7% by weight total, said colorant being selected from the group consisting of CdS, cadmium sulfoselenide, $CeO_2$, $Co_3O_4$, $Cr_2O_3$, CuO, $Fe_2O_3$, $MnO_2$, NiO, $V_2O_5$, and mixtures thereof.

4. A glass-ceramic article according to claim 1 which is self-glazed wherein said interior portion and said surface layer have essentially the same base composition consisting essentially, expressed in terms of weight percent on the oxide basis, of 9-18% $Li_2O$, 2-10% total of at least one member of the group consisting of a 0-7% $K_2O$, 0-8% CaO, 0-6% SrO, and 0-6% BaO, 0-7% ZnO, 0-10% $Al_2O_3$, 1.5-10% ZnO+$Al_2O_3$, with a molar ratio $(K_2O+CaO+SrO+BaO):(ZnO+Al_2O_3)$ between 0.1-0.8, 65-77% $SiO_2$, and as a nucleating agent 2-6% $P_2O_5$.

5. A glass-ceramic article according to claim 4 wherein the colorant contained in said surface layer is present in an amount of about 0.01-7% by weight total and is selected from the group consisting of CdS, cadmium sulfoselenide, $CeO_2$, $Co_3O_4$, $Cr_2O_3$, CuO, $Fe_2O_3$, $MnO_2$, NiO, $V_2O_5$, and mixtures thereof.

6. A glass-ceramic article according to claim 4 wherein said interior portion is also colored through the presence of a colorant therein in an amount of about 0.01-7% by weight total, said colorant being selected from the group consisting of CdS, cadmium sulfoselenide, $CeO_2$, $Co_3O_4$, $Cr_2O_3$, CuO, $Fe_2O_3$, $MnO_2$, NiO, $V_2O_5$, and mixtures thereof.

* * * * *